United States Patent [19]

Marsden

[11] 4,106,637

[45] Aug. 15, 1978

[54] APPARATUS FOR AND METHOD OF LOADING LOOSE GRANULAR MATERIAL FROM BARGES INTO SHIPS

[75] Inventor: John Marsden, Kenner, La.

[73] Assignee: Halter Marine Services, Inc., New Orleans, La.

[21] Appl. No.: 782,649

[22] Filed: Mar. 30, 1977

[51] Int. Cl.² .............................................. B65G 67/58
[52] U.S. Cl. ......................................... 214/13; 114/45; 214/152
[58] Field of Search .................. 214/12, 13, 14, 152; 114/45, 72, 73, 263

[56] References Cited

U.S. PATENT DOCUMENTS

| 3,826,384 | 7/1974 | Cecce | 214/13 |
| 3,841,501 | 10/1974 | Heijst | 214/13 |

FOREIGN PATENT DOCUMENTS 2,042,850 8/1970 Fed. Rep. of Germany ............ 114/45

Primary Examiner—Robert G. Sheridan
Assistant Examiner—George F. Abraham
Attorney, Agent, or Firm—James B. Lake, Jr.

[57] ABSTRACT

A floating transfer vessel provides exterior mooring for a ship adapted to receive loose granular cargo, and interior dry-docking for a plurality of barges loaded with loose granular material within the transfer vessel. All relative motion between transfer vessel and barges, and between automated digging and conveying apparatus mounted in the transfer vessel and barge confines or cargo spaces are eliminated, to permit substantial reduction of working tolerances therebetween without possibility of damage. The reduced tolerances leaves very little grain to clean up requiring no additional independent equipment.

3 Claims, 6 Drawing Figures

APPARATUS FOR AND METHOD OF LOADING LOOSE GRANULAR MATERIAL FROM BARGES INTO SHIPS

BACKGROUND OF THE INVENTION

The invention relates generally to floating grain elevators, and more particularly to floating transfer vessels for loose granular materials that are movable from place to place for the transfer from barges to ships and the temporary storage of loose granular materials.

In the prior art floating grain elevators provided mooring spaces to a ship on one side and to barges on the other, and to automated digging and conveying apparatus mounted on and in itself. Relative movement between the barges and the transfer vessel, as by waves from passing ships, often caused damage to the automated apparatus unless large working tolerances were used, thereby leaving large amounts of grain in the barges and necessitating independent clean-up equipment being furnished.

SUMMARY OF THE INVENTION

It is an object of the invention to provide a floating transfer vessel for unloading loose granular material from barges in which the barges could be made relatively motionless with respect to said transfer vessel.

Another object of the invention is to provide automated digging and conveying apparatus for loose granular material that could be operated with little working tolerances, to thereby leave little granular material in said barges.

DETAILED DESCRIPTION OF THE INVENTION

Figure 1:
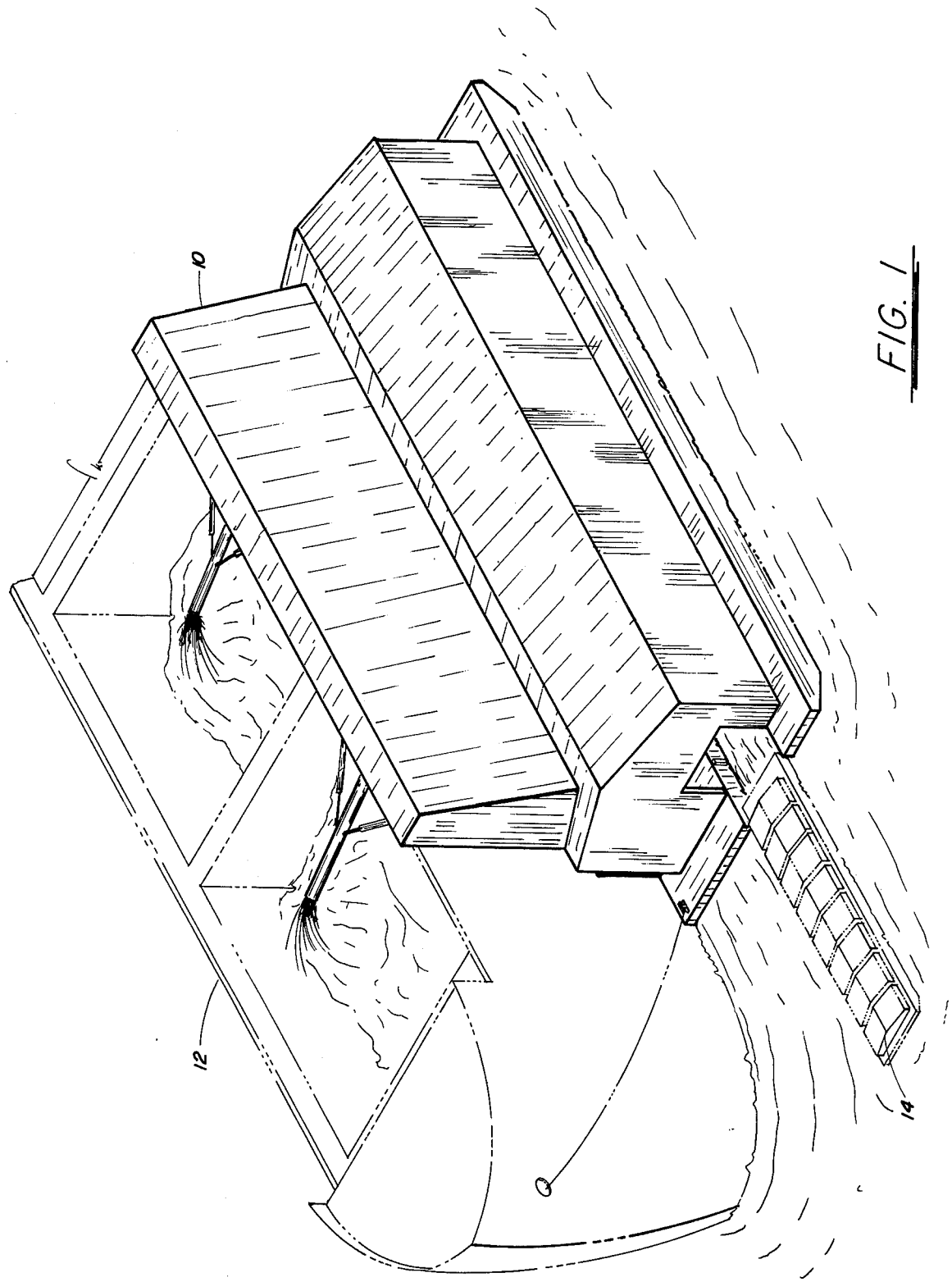
FIG. 1 is a three dimensional view of the invention in working cooperation with ship and barges.
Figure 2:
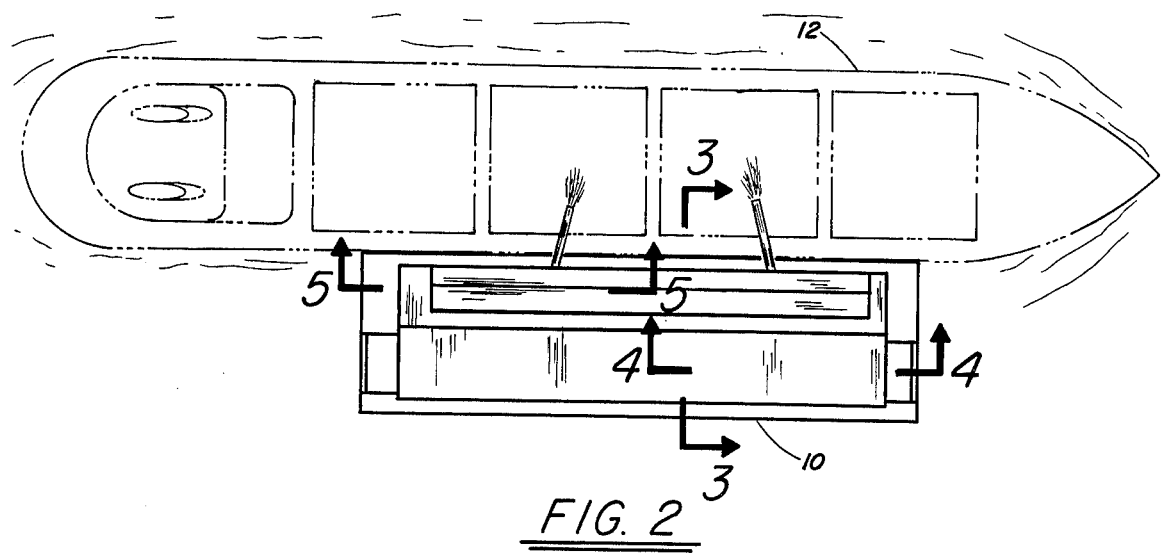
FIG. 2 is substantially a plan view of FIG. 1 with barges docked within a transfer vessel.
Figure 6:
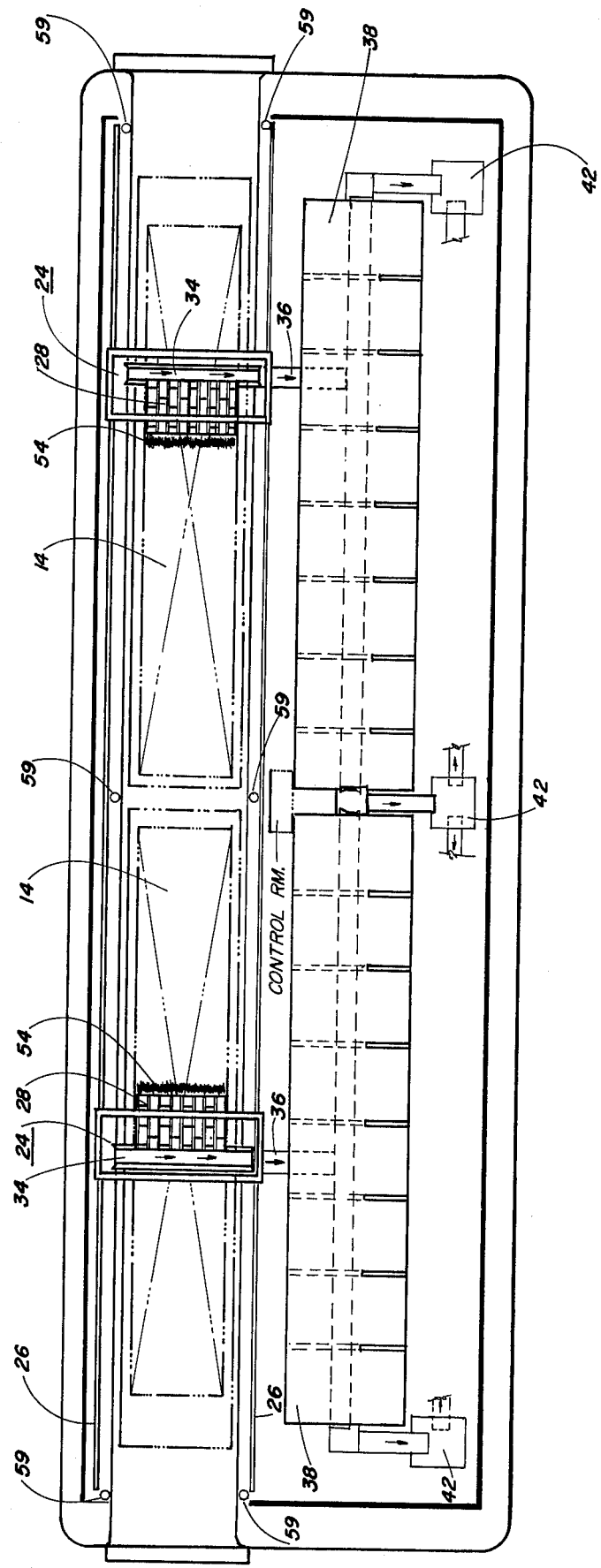
FIG. 6 is a longitudinal cross-sectional view taken along section lines 6—6 of FIG. 3.

Referring to FIGS. 1, 2 and 6, the invention comprises a transfer vessel 10 which is conveniently anchored to leave access to a side and an end thereof. A ship 12 is externally moored to the accessible side, and a plurality of barges 14 are floatable into a passageway 16 defined in transfer vessel 10 opening at said accessible end and extending longitudinally therein along an opposite side from the ship mooring side. A water-tight closure 18 is hinged to said accessible end for opening and closing passageway 16 (see FIG. 4). After a string of loaded barges 14 have been floated into the passageway, the watertight closure 18 is swung upward and closed and water pumped out until barges 14 are grounded in transfer vessel 10 to prevent any relative motion between barges and vessel.

Figure 3:
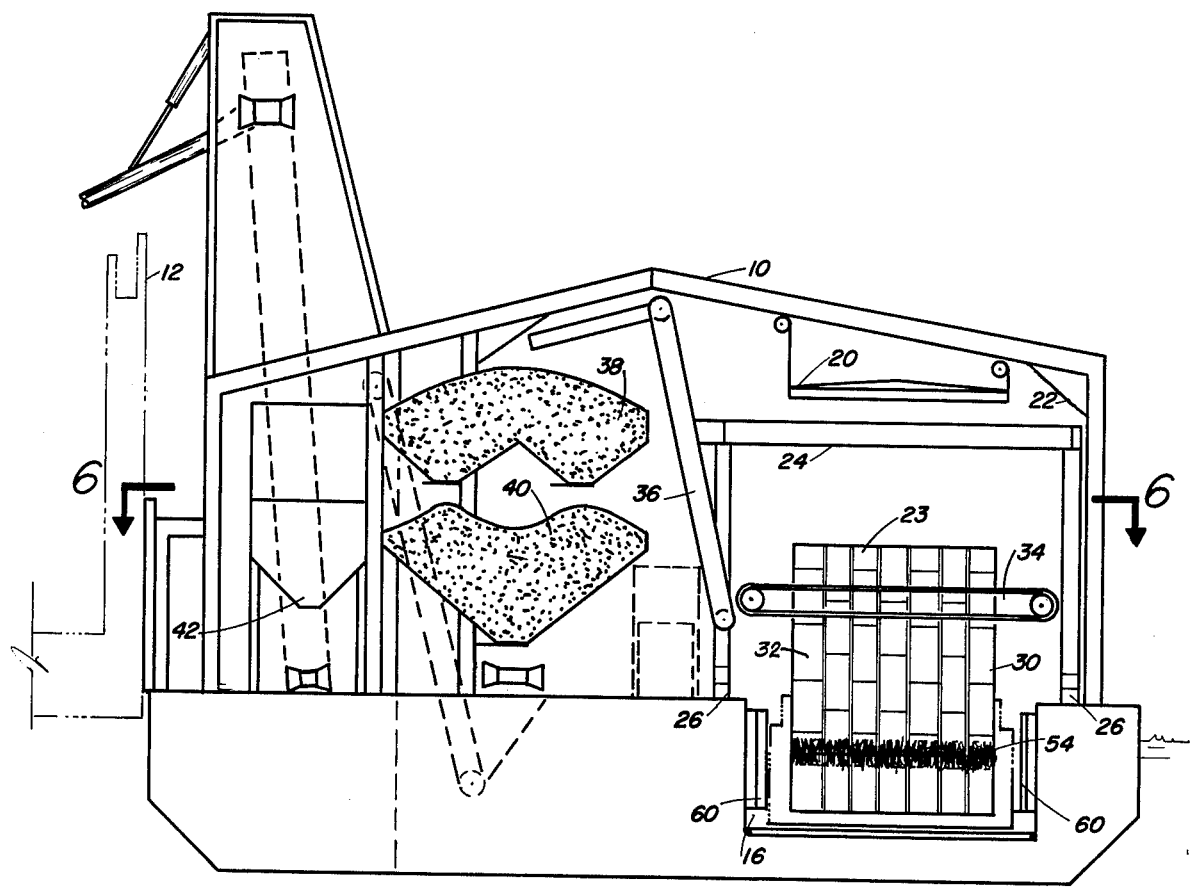
FIG. 3 is an enlarged vertical cross-sectional view along section lines 3—3 of FIG. 2.
Figure 4:
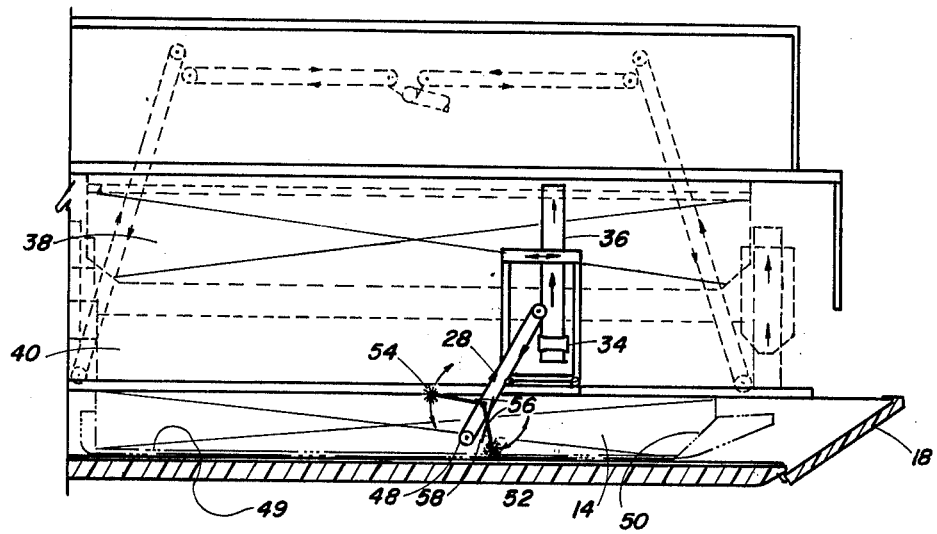
FIG. 4 is an enlarged longitudinal cross-sectional view along section lines 4—4 of FIG. 2.
Figure 5:
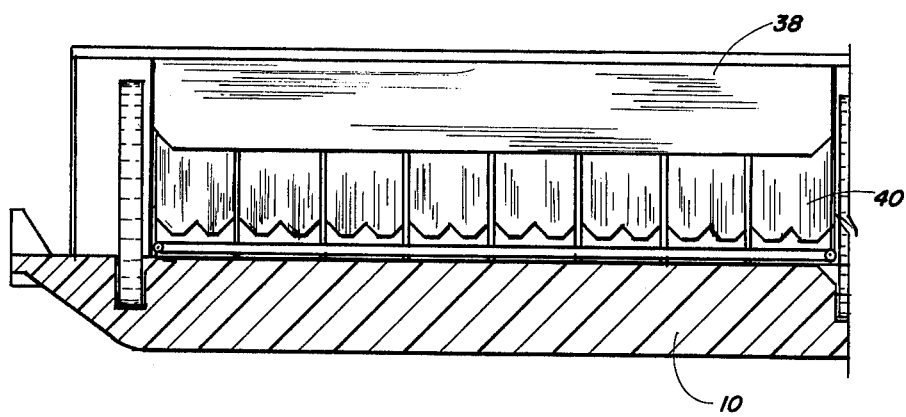
FIG. 5 is the same as FIG. 4 except it is taken along section lines 5—5 of FIG. 2.

Referring to FIGS. 3-5 inclusive, barge hatch covers 20 are removable by overhead block and tackle 22 and held aloft and out of the way. Automated digging and conveying apparatus 23 comprises a gantry 24 running on rails 26 along the sides of passageway 16 to support digging apparatus 28 that is lowered into a barge at an end and extends transversely across the confines or cargo space thereof and is propelled by said gantry for the length thereof. Digging apparatus 28 digs out the granular material cargo by means of an endless belt 30 of digging buckets 32 which lifts said granular material upward and discharges it into a first horizontal conveyor 34 that carries it transversely to a side and discharges into another near vertical conveyor 36 for discharge into an upper hopper 38 where samples are taken for testing. The upper hopper discharges into a lower holding hopper 40, pending tests, the results of which determines whether the granular material is returned to the barge from whence it came or is conveyed for weighing into a weight hopper 42, and from there by sundry conveyances for discharge into moored ship 12.

A lower end 46 of digging apparatus 28 is mounted on small wheels 48 which supports said lower end just clear of cargo space bottom 49 and sloping end 50 thereof. Rotatable brushes 52 and 54 are pivotally mounted for rotation on arms 56 pivoted to digging apparatus before and aft of said lower end 46. The after brush 52 brushes forwardly granular material passed over by digging buckets 32 into a suction line 58 that discharges into horizontal conveyor 34. The forward brush 54 brushes rearwardly granular material in corners not reachable by said digging buckets 32 into said buckets.

In use, the invention grounds a barge within itself so that no relative motion between them can occur to damage automated digging and conveying apparatus, and to reduce working tolerances of components of said apparatus to a minimum that requires no additional clean-up apparatus to completely empty a loaded barge. After being delivered to the entrance of passageway 16 by tug, the barges 14 can be winched into position by means of winches 59 positioned on both sides and at the ends and middle of said passageway respectively. The barges are centered in passageway 16 by means of hydraulic rams 60 mounted in the sides thereof, said rams being limited in transverse movement so as not to frictionally engage the sides of said barges simultaneously.

What is claimed is:

1. A floating transfer vessel for loading loose granular material from barges into a ship comprising in combination:
   a. a docking platform integral with said transfer vessel for mooring a ship thereto;
   b. a floodable barge passageway defined longitudinally in said transfer vessel along a side opposite to said docking platform for floating a string of loaded barges therein;
   c. a closure mounted in an end of said passageway for the opening and closing thereof watertightly;
   d. means for flooding and pumping out water, sufficient to float and to ground said barges in said barge passageway, mounted in said transfer vessel thereby making said transfer vessel and barges relatively movable and immovable in sequence; and
   e. automated means, for digging and transferring granular materials from barge to ship, mounted in said transfer vessel and integral therewith and with said barges grounded in said barge passageway, said automated means being adjustable to closely follow the barge confines of said granular material without an allowance for relative movement between said transfer vessel and grounded barges.

2. A floating transfer vessel as described in claim 1 wherein said automated means for digging comprises in combination;
 a. a gantry spanning said barge passageway and movable the length thereof;
 b. a box structure supported on said gantry and adapted to depend into confines of a barge grounded in said barge passageway;
 c. an endless belt of buckets mounted for rotation around said box structure and extending transversely across the interior confines of said barges;
 d. wheels mounted on the depending end of said box structure for supporting said end just clear of said barge's bottom and ends, and
 e. rotating brushes respectively mounted on arms pivoted on said box structure fore and aft of said endless belt of buckets, said fore brush sweeping granular material unreachable by said belt of buckets back therein, and said aft brush sweeping granular materials left by said buckets forward for removal by vacuum, thereby eliminating need for clean-up apparatus.

3. Method of unloading loose granular material from barges and loading it into ships using floating transfer vessels, each having a ship mooring side and a floodable barge passageway side, and automated digging and conveying apparatus adapted to moving said loose granular material vertically and transversely therein and out, comprising the steps of:
 (a) flooding said floodable barge passageway by opening an end thereof;
 (b) mooring an empty ship along the mooring side of said floating transfer vessel;
 (c) floating said loaded barges into said flooded barge passageway and securing therein under and in alignment with said automatic digging and conveying apparatus;
 (d) pumping out said flooded barge passageway to ground said barges therein as aligned for eliminating relative movement between said barges and said floating transfer vessel thereby permitting the reduction of working tolerances in said automated digging and conveying apparatus to remove all loose granular material from said barges.

* * * * *